United States Patent
Heggen

(10) Patent No.: US 11,149,662 B2
(45) Date of Patent: Oct. 19, 2021

(54) ZERO EMISSION PROPULSION SYSTEMS AND GENERATOR SETS USING AMMONIA AS FUEL

(71) Applicant: Lars Harald Heggen, Drammen (NO)

(72) Inventor: Lars Harald Heggen, Drammen (NO)

( * ) Notice: Subject to any disclaimer, the term of this patent is extended or adjusted under 35 U.S.C. 154(b) by 0 days.

(21) Appl. No.: 16/636,106

(22) PCT Filed: Aug. 8, 2018

(86) PCT No.: PCT/NO2018/050204
§ 371 (c)(1),
(2) Date: Feb. 3, 2020

(87) PCT Pub. No.: WO2019/035718
PCT Pub. Date: Feb. 21, 2019

(65) Prior Publication Data
US 2021/0164407 A1 Jun. 3, 2021

(30) Foreign Application Priority Data
Aug. 14, 2017 (NO) .................................. 20171354

(51) Int. Cl.
*F02D 19/06* (2006.01)
*F02M 21/00* (2006.01)
(Continued)

(52) U.S. Cl.
CPC ........ *F02D 19/0644* (2013.01); *F02B 19/108* (2013.01); *F02B 19/1028* (2013.01);
(Continued)

(58) Field of Classification Search
CPC .... F02B 19/108; F02B 19/1028; F02B 43/10; F02D 19/0644; F02D 19/10;
(Continued)

(56) References Cited

U.S. PATENT DOCUMENTS 3,455,282 A * 7/1969 Pearsall .................. F02B 43/10
123/1 R
4,041,910 A * 8/1977 Houseman .............. F02B 43/10
123/58.8
(Continued)

FOREIGN PATENT DOCUMENTS

| JP | H05-332152 A | 12/1993 |
|---|---|---|
| WO | 2012170003 A2 | 12/2012 |
| WO | 2013172141 A1 | 1/2016 |

OTHER PUBLICATIONS

EP Appln. No. 18845886.3. Third Party Observations Re JPH05-332152 (Apr. 21, 2021).

*Primary Examiner* — Erick R Solis
(74) *Attorney, Agent, or Firm* — Loza & Loza, LLP; Patrick B. Law

(57) ABSTRACT

The present invention relates to a zero emission propulsion system and generator sets using ammonia ($NH_3$) as fuel for engines and power plants such as steam boilers (5) for steam turbines (7), piston engines (9), fuel cells (10) or Stirling engines (11). Due to the poor flammability of ammonia ($NH_3$), a hydrogen reactor (4) can split ammonia ($NH_3$) into hydrogen ($H_2$) and nitrogen ($N_2$). The hydrogen ($H_2$) can be placed in a hydrogen tank (8) for intermediate storage and the nitrogen can be stored in a nitrogen tank (6). The hydrogen ($H_2$) could be mixed with ammonia ($NH_3$) to improve flammability and thus facilitate the ignition of an air/ammonia ($NH_3$) mixture in engines or power plants (5, 9, 11). Alternatively, hydrogen (¾) may be supplied in a separate fuel system (5-1, 9-5, 11-8) as a pilot fuel for pilot ignition of an air/ammonia (NH3) mixture. The hydrogen ($H_2$) can also be used in AIP systems along with oxygen ($O_2$) from an oxygen tank (22). The hydrogen ($H_2$) will then be used for fuel cells (10), for combustion in a steam turbine inlet/high pressure side (7-1), or in a Stirling engine (11). In (Continued)

addition to hydrogen ($H_2$), other bio and fossil fuels from the fuel tank (12) can be used as pilot fuel for pilot ignition of an air/ammonia ($NH_3$) mixture. The advantage of using existing bio or fossil fuels for pilot ignition is that engines or power plants (5, 9, 11) will have a pilot fuel system with sufficient capacity to maintain normal operations if ammonia ($NH_3$) is not available. Alternatively, that engines or power plants (5, 9, 11) have an additional fuel system for existing bio or fossil fuels in order to maintain normal operations if ammonia ($NH_3$) is not available. The nitrogen ($N_2$) in the nitrogen tank (6) can be used as a gas in fire extinguishing systems or for submarine ballast tank blows.

8 Claims, 6 Drawing Sheets

(51) Int. Cl.
```
      F02M 25/12        (2006.01)
      F02M 21/02        (2006.01)
      F02M 25/10        (2006.01)
      F02B 19/10        (2006.01)
      F02D 41/00        (2006.01)
```
(52) U.S. Cl.
CPC ..... *F02D 19/0671* (2013.01); *F02M 21/0206* (2013.01); *F02M 21/0215* (2013.01); *F02M 25/10* (2013.01); *F02D 41/0027* (2013.01)

(58) Field of Classification Search
CPC .... F02M 21/0206; F02M 25/10; F02M 25/12; F02M 27/02
USPC ....... 123/3, 27 GE, 525, 526, 431, 575, 267, 123/277, DIG. 12
See application file for complete search history.

(56) References Cited

U.S. PATENT DOCUMENTS

| | | | | |
|---|---|---|---|---|
| 4,108,114 | A * | 8/1978 | Kosaka | F02D 19/0644 |
| | | | | 123/3 |
| 4,326,483 | A * | 4/1982 | Lowther | F02B 43/08 |
| | | | | 123/3 |
| 4,413,474 | A | 11/1983 | Moscrip | |
| 4,567,857 | A | 2/1986 | Houseman et al. | |
| 6,155,212 | A * | 12/2000 | McAlister | F02B 43/10 |
| | | | | 123/3 |
| 8,025,033 | B2 * | 9/2011 | Schiltz | F02B 43/10 |
| | | | | 123/1 A |
| 8,904,994 | B2 * | 12/2014 | Michikawauchi | F02M 25/14 |
| | | | | 123/299 |
| 2002/0100836 | A1 * | 8/2002 | Hunt | F02M 21/023 |
| | | | | 244/50 |
| 2003/0200939 | A1 * | 10/2003 | Hiltner | F02B 43/10 |
| | | | | 123/3 |
| 2008/0256933 | A1 * | 10/2008 | Black | F02M 25/12 |
| | | | | 60/295 |
| 2009/0120385 | A1 | 5/2009 | Munshi et al. | |
| 2010/0288249 | A1 | 11/2010 | Sasaki et al. | |
| 2011/0011354 | A1 | 1/2011 | Dincer et al. | |
| 2011/0108000 | A1 * | 5/2011 | Williams | F02M 25/03 |
| | | | | 123/25 C |
| 2011/0265463 | A1 | 11/2011 | Kojima et al. | |
| 2011/0297120 | A1 * | 12/2011 | Hurt | F02B 41/06 |
| | | | | 123/25 A |
| 2012/0280517 | A1 | 11/2012 | Hair, III et al. | |
| 2013/0247867 | A1 * | 9/2013 | Shmueli | F02D 19/0644 |
| | | | | 123/25 A |
| 2013/0319359 | A1 | 12/2013 | Evans | |
| 2013/0340710 | A1 | 12/2013 | Fukuyama et al. | |

* cited by examiner

ZERO EMISSION PROPULSION SYSTEMS AND GENERATOR SETS USING AMMONIA AS FUEL

KNOWN TECHNOLOGY

Zero emission systems are defined as energy systems that do not release $CO_2$. Propulsion systems of this kind have become relevant since establishment of the relationship between the atmospheric $CO_2$ content and global warming.

The problem with using pure hydrogen ($H_2$) as fuel is that, for most purposes, hydrogen ($H_2$) must be stored as compressed gas. This makes the energy density relatively low. Leakage from tanks also becomes relatively large due to the size of the hydrogen atom which allows it to penetrate through most materials. In gas form, the density of hydrogen ($H_2$) is low, resulting in low energy density. Hydrogen's ($H_2$) boiling point ($-252.9°$ C.) and melting point ($-259.2°$ C.) makes it inconvenient to use hydrogen ($H_2$) in liquid or solid form as fuel for most propulsion systems. Aerospace is one of the exceptions where both liquid and solid hydrogen ($H_2$) are used.

Ammonia ($NH_3$) is therefore a better energy carrier. The main drawback is that it is toxic. But it could be a better alternative than pure hydrogen ($H_2$) as it can be stored in liquid form at approx. 10 bar at room temperature ($25°$ C.), or approx. $-33.4°$ C. at a pressure of 1 atm. There is a large global production of ammonia ($NH_3$), so it is readily available. The problem with ammonia ($NH_3$) is that it is not a very flammable fuel. It is possible to split ammonia ($NH_3$) into hydrogen ($H_2$) and nitrogen ($N_2$) either through catalytic high temperature cleavage using ruthenium (Ru), or through chemical cleavage using sodium (Na) in accordance with chemist Arthur Titherley's process. Alternatively, ammonia ($NH_3$) can be ignited by pilot ignition using hydrogen ($H_2$) or another bio or fossil fuel. It is also possible to blend in other gases like hydrogen ($H_2$), CNG/LNG or LPG into ammonia ($NH_3$) to improve ignition.

Pilot ignition of an air/fuel mixture in an internal combustion engine is used in both Otto and diesel engines. With diesel engines, diesel injection is used to ignite an air/fuel mixture that has been mixed in the engine intake system and is sucked in and compressed in the engine cylinder. The disadvantage of this system is that using ammonia ($NH_3$) as a fuel, the oxygen ($O_2$) content of the mixture will be low and if diesel or biodiesel is used for pilot ignition of an ammonia ($NH_3$)/air mixture, it will be difficult to achieve complete combustion of the diesel or biodiesel.

One solution to this problem is to use the CVCC combustion system developed by Honda. This ensures a separate supply of fresh air to the pilot ignition, which makes ignition easier and combustion more complete. With submarines, ammonia ($NH_3$) can be used directly or by cleavage to hydrogen ($H_2$) for an AIP (air-independent propulsion) system.

Known technology in the field includes:
US 2010/0288249 A1
"Internal combustion engine with ammonia fuel" which describes the use of ammonia as fuel from cleavage of ammonia to nitrogen and hydrogen by means of high temperature.
US 2009/0120385 A1
"Method And Apparatus Of Fuelling An Internal Combustion Engine With Hydrogen And Methane" which describes the use of methane mixed with hydrogen (hytan) to improve ignition.
US 2011/0011354 A1
"Methods and apparatus for using ammonia as sustainable fuel, refrigerant and NOx reduction agent" which describes the use of ammonia as fuel in conjunction with cooling by evaporation of ammonia, as well as cleavage of ammonia to nitrogen and hydrogen, through thermal cleavage, catalytic cleavage and a combination of these two.
US 2013/0319359 A1
"System And Method For Energy Recovery In A Hydrogen Or Natural Gas Engine" which describes the use of hydrogen or methane as fuel for hybrid operation, where the pressure in the fuel tank is used to drive a turbine.
US 2013/0340710 A1
"Injection apparatus" which describes an ammonia injection system specially designed for 2-stroke engines, but which can also be used with 4-stroke engines where high pressure gas is used to inject fuel into the cylinder.
US 2012/0280517 A1
"Stable hydrogen-containing fuels and systems and methods for generating energy therefrom" which describes the use of hydrogen peroxide or other oxygen carriers as a reducing agent for preferably inorganic fuels such as ammonia.
U.S. Pat. No. 4,567,857 A
"Combustion engine system" which describes a methanol catalyst for converting methanol to hydrogen and carbon monoxide for use as fuel in engines. The system uses methanol or preferably diesel as pilot ignition for diesel engines.
U.S. Pat. No. 4,413,474 A
"Mechanical arrangements for Stirling-cycle, reciprocating thermal machines" which describes the design of a Stirling engine.
WO 2012/170003 A2
"A system for making and using liquid fuels and fertilizer from electricity and designs and uses of linear electric machines" which describes Wood's Electric Machines which preferably run on Ammonia.
US 2011/0265463 A
"Ammonia burning internal combustion engine" which describes the use of a plasma jet or several sparkplugs to ignite ammonia in a normal Otto engine.
US 2013/0247867 A1
"Internal combustion engine using a water-based mixture as fuel and method for operating the same" which describes hydrogen used as an additive to improve ignition of a fuel mixture with water.
U.S. Pat. No. 6,155,212 A
"Method and apparatus for operation of combustion engines" which describes a method for improving energy utilisation in an engine,
and
WO 2013/172141 A1
"Ammonia engine" which describe a method for improving energy utilisation in an engine that runs on ammonia.

SHORT DESCRIPTION OF THE INVENTION

The advantage of this invention is how ammonia ($NH_3$) is utilised directly as a fuel, or is split into pure hydrogen ($H_2$) as fuel for propulsion systems and generators Ammonia ($NH_3$) is a flammable substance that can be used as a fuel for air, water and land-based transport as well as generators for different types of plants, such as emergency power plants, water pumps, etc. The disadvantage is that ammonia ($NH_3$) is difficult to ignite.

In order to have a zero emission system, the system must not produce $CO_2$. This effectively limits zero emission systems to electrical or hydrogen-powered systems. For hydrogen-powered systems, ammonia ($NH_3$) is the easiest way to store hydrogen ($H_2$).

In order to utilize ammonia ($NH_3$) as fuel, most means of transportation would benefit from being able to use either multiple propulsion systems or, alternatively, propulsion systems that can use several different fuels.

In order to ensure good ignition of ammonia ($NH_3$), another system is required to serve as a pilot ignitor of an ammonia ($NH_3$) and air mixture. This pilot ignition can take place using pure hydrogen ($H_2$), other biofuels or traditional fossil fuels, both liquid and gaseous.

In order to ensure good ignition of an air/ammonia ($NH_3$) mixture in an internal combustion engine, it would be advantageous to use a separate pilot ignition system consisting of a separate prechamber with its own air or air/fuel intake. An air/hydrogen ($H_2$) mixture can be used for pilot ignition of zero emission engines, where such an air/hydrogen ($H_2$) mixture is sucked into a prechamber in connection with the cylinder and ignited by spark ignition. Alternatively, other bio or fossil fuels may be used for such a pilot ignition system. With diesel engines, fresh air is sucked into this prechamber and pilot ignition of an air/ammonia mixture is effected by pilot injection of either bio or fossil diesel oil into the prechamber. The advantage of such a system is that the combustion engine can be used as a conventional engine powered by bio or fossil fuels if the ammonia ($NH_3$) supply is limited. Diesel engines will then operate as traditional prechamber engines.

DETAILED DESCRIPTION OF THE INVENTION

Figure 1:
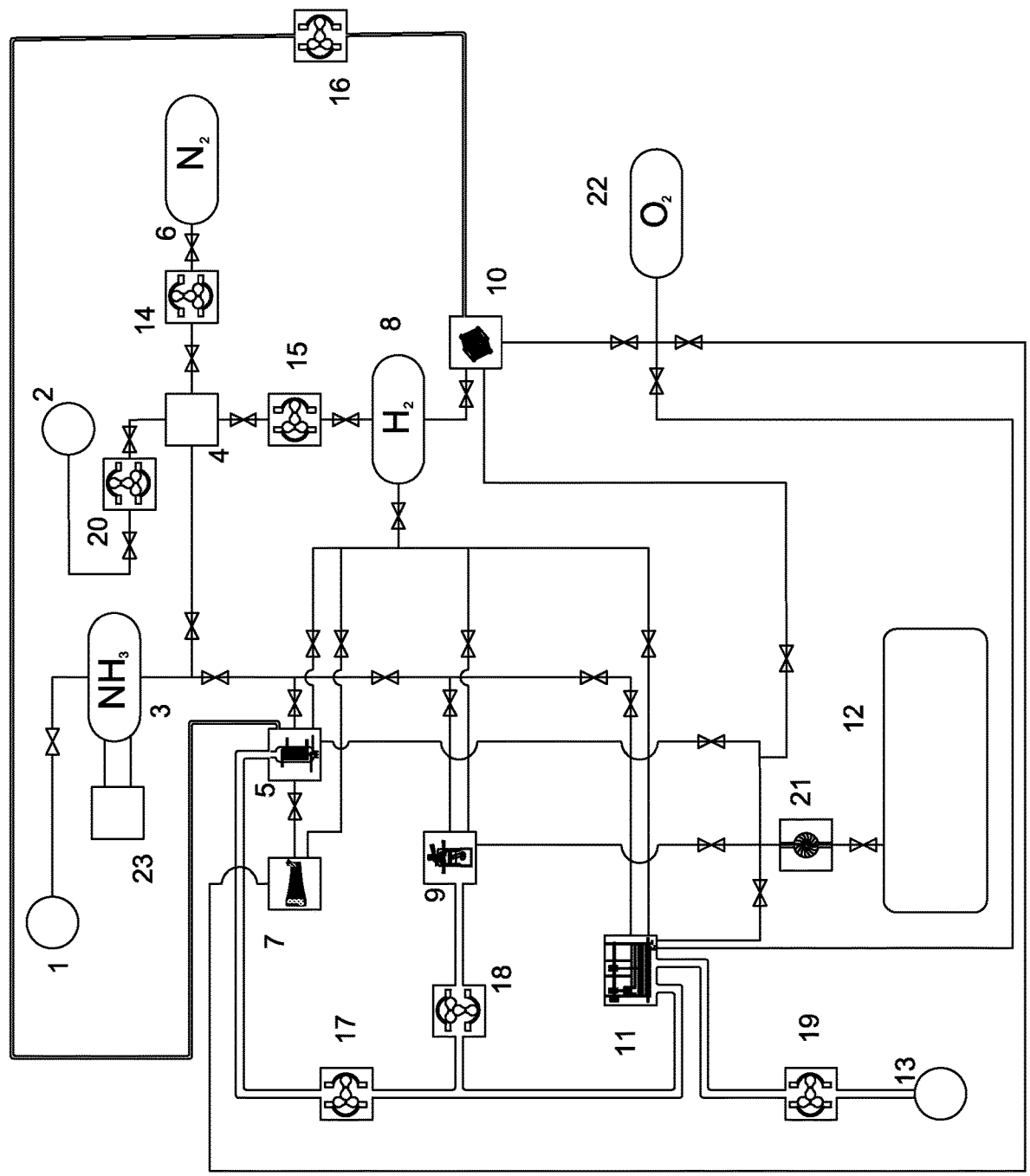
FIG. 1) is an embodiment of the invention exemplified with several power/propulsion/generator systems with both ammonia ($NH_3$) and bio or fossil fuels. The system also has a reactor for the production of pure hydrogen ($H_2$) and with a tank for pure oxygen ($O_2$).
Figure 2:
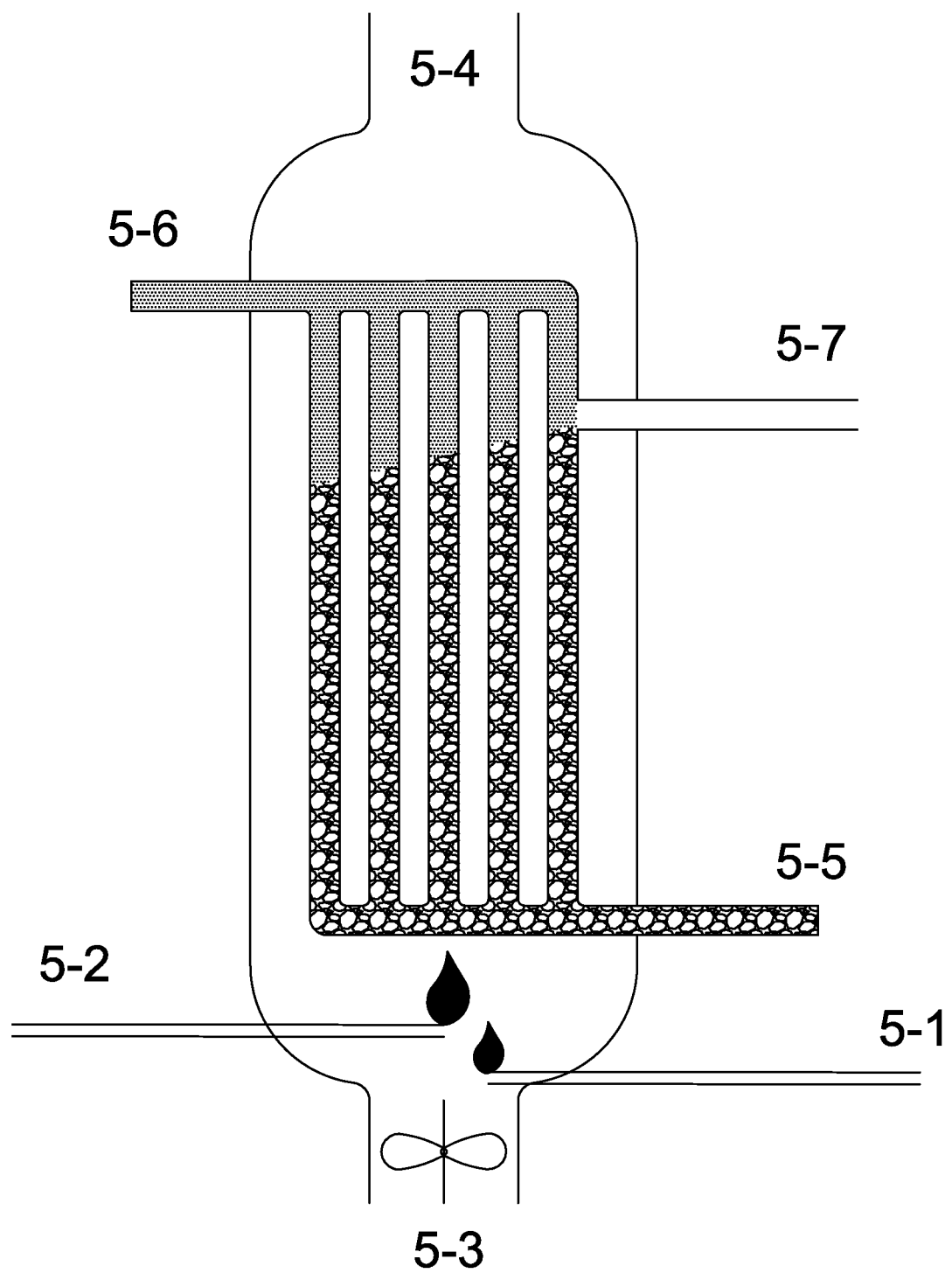
FIG. 2) is an embodiment of the invention exemplified with a steam boiler heated with ammonia ($NH_3$) as the main fuel.
Figure 3:
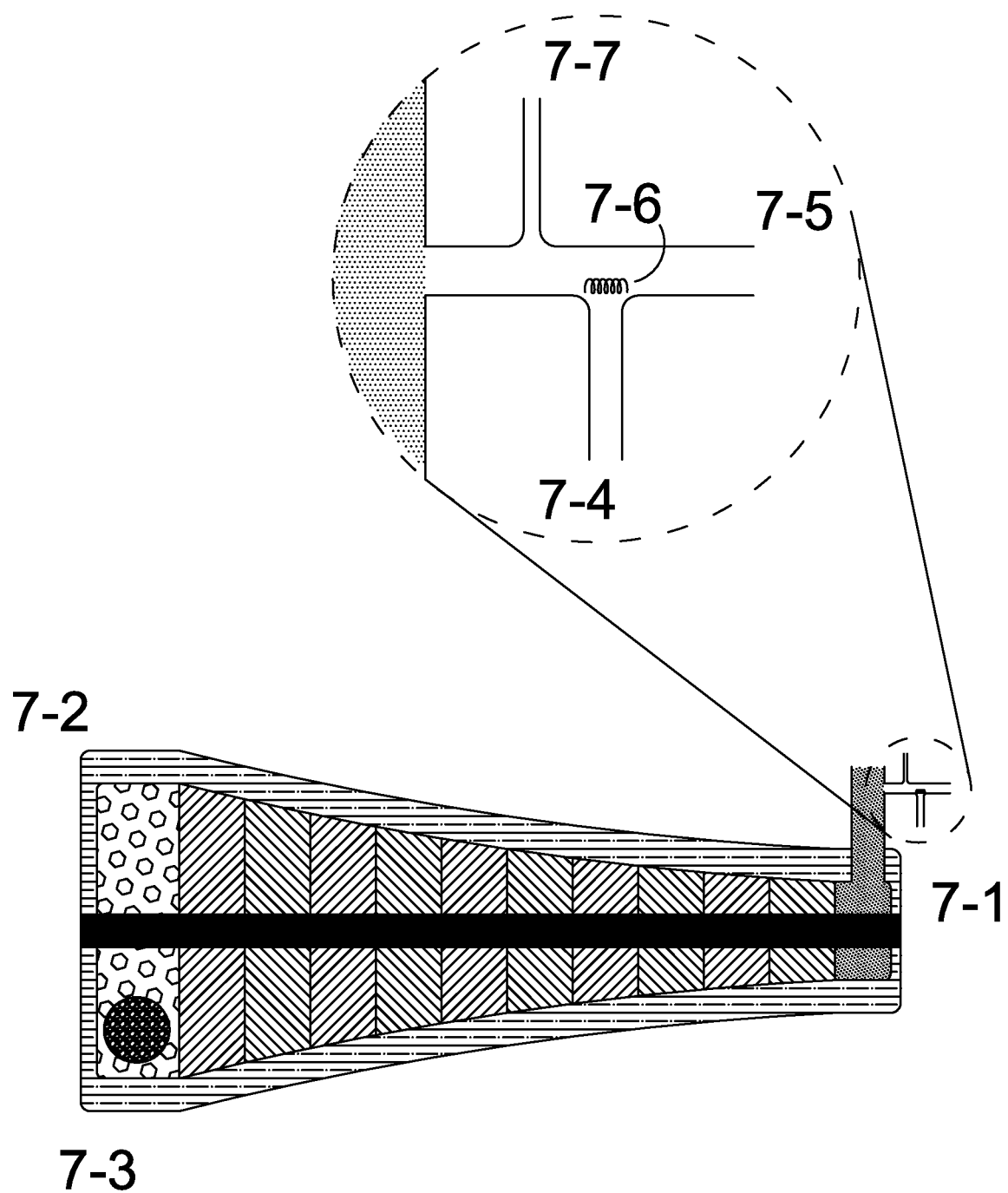
FIG. 3) is an embodiment of the invention exemplified with a steam turbine with the ability to operate with an AIP system.
Figure 4:
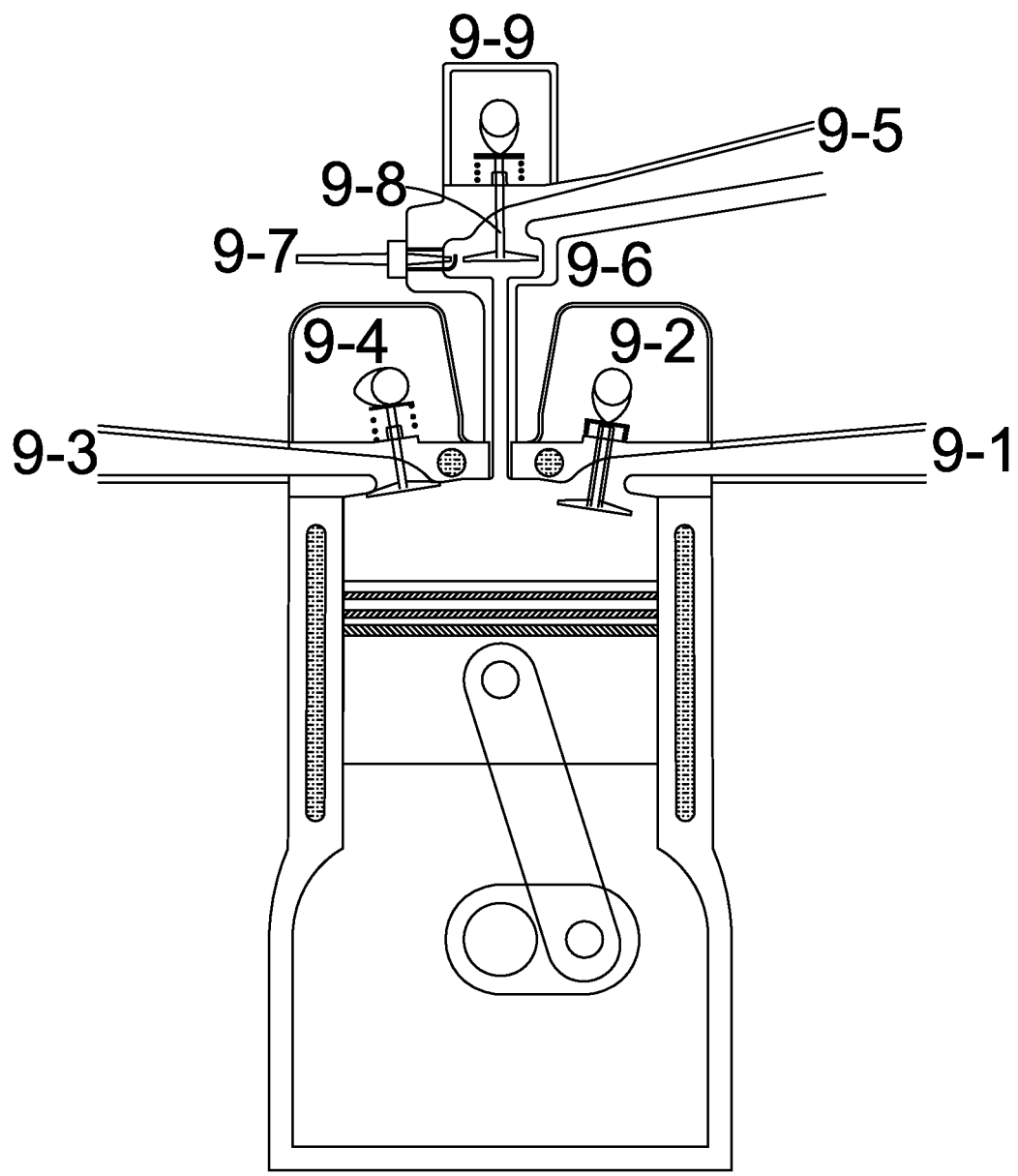
FIG. 4) is an embodiment of the invention exemplified with a piston engine with prechamber for pilot ignition of an air/ammonia ($NH_3$) mixture in the cylinder. Air or an air/fuel mixture to the prechamber is led through a separate intake system.
Figure 5:
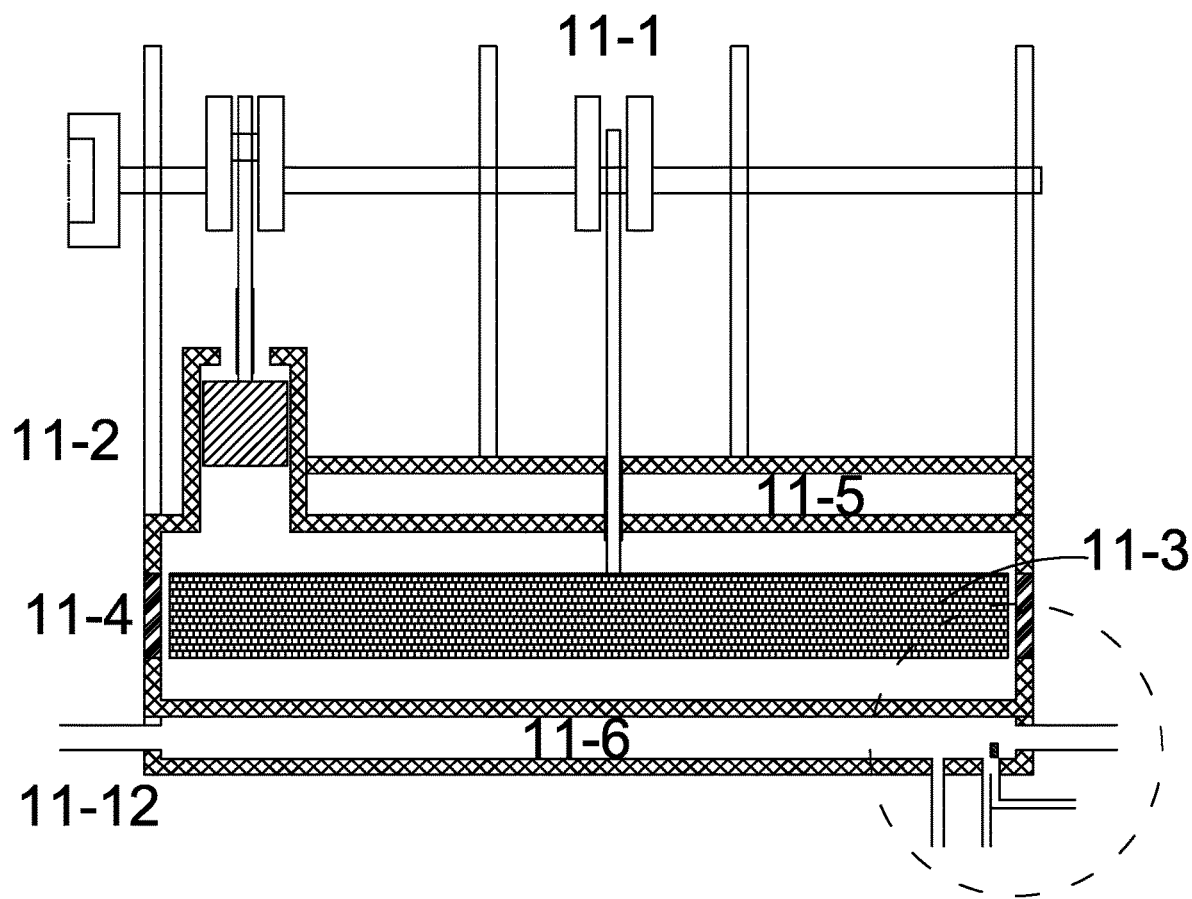
FIG. 5) is an embodiment of the invention exemplified with a Stirling engine to either utilize the exhaust heat from a steam boiler and/or a piston engine, as well as being able to function as all or part of an AIP system.
Figure 6:
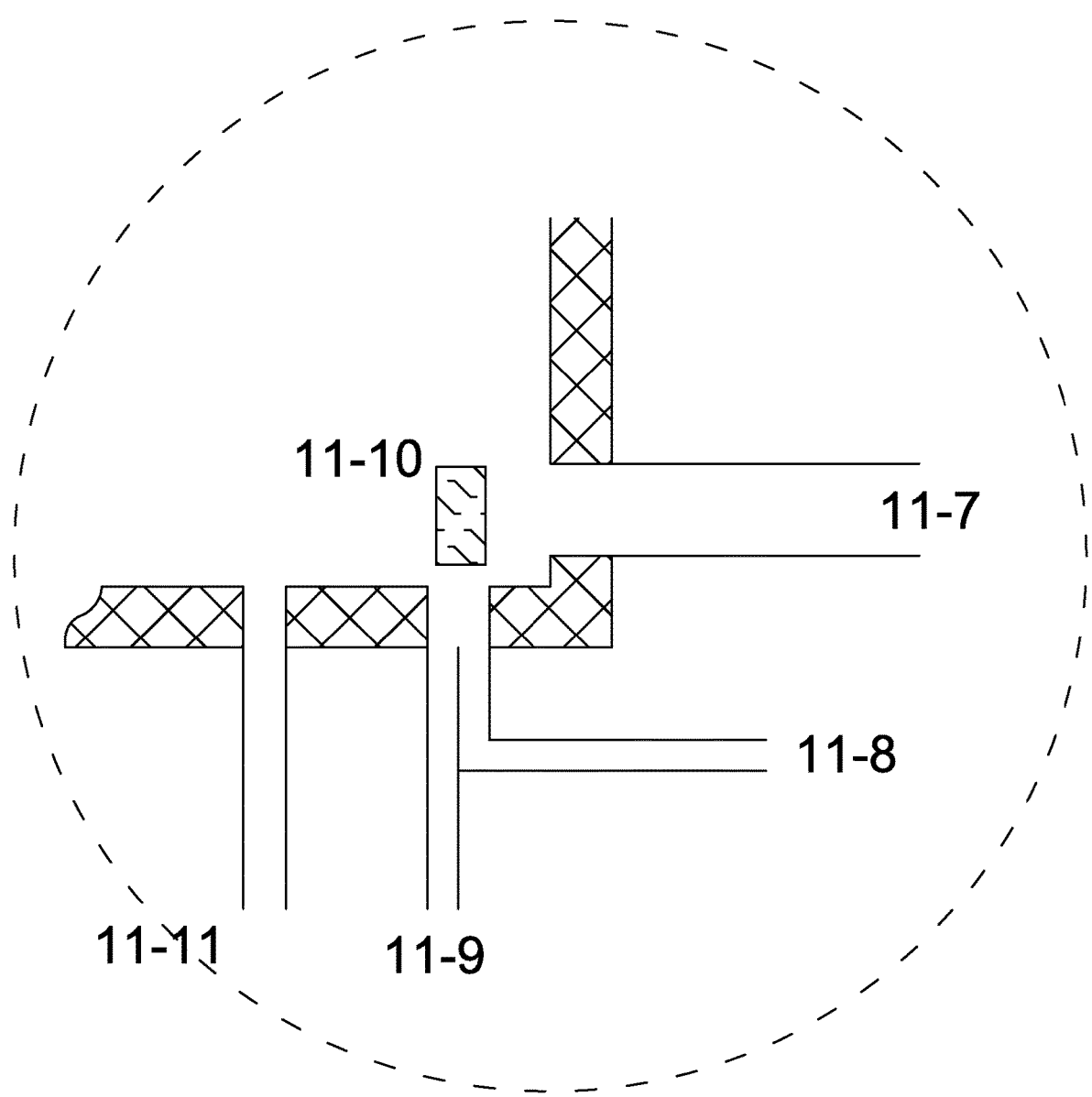
FIG. 6) is an embodiment of the invention exemplified with the fuel supply of the Stirling engine.

1) Ammonia ($NH_3$) fuelling.
Ammonia ($NH_3$) fuelling will normally take place at a pressure of approximately 10 bar, which is the vapour pressure of ammonia ($NH_3$) at approx. 25° C. Here, different fuelling devices can be used depending on whether the ammonia ($NH_3$) is stored as a liquid under pressure (at about 10 bar at 25° C.) or cooled (at about −33.4° C. at 1 atm). There will also be different fuelling devices depending on the type of vehicle or vessel. For vehicles, the same refuelling device as for LPG could be used.

2) Venting nitrogen ($N_2$) ($N_2$ from exhaust).
This is the venting/exhaust of nitrogen ($N_2$) from the hydrogen reactor (4). If ammonia ($NH_3$) is cleaved to produce nitrogen ($N_2$) and hydrogen ($H_2$), excess nitrogen ($N_2$) will be vented to air.

3) Fuel tank(s) for ammonia ($NH_3$).
Tank for storage of ammonia ($NH_3$). The ammonia ($NH_3$) is stored in liquid form either under pressure (at approx. 10 bar) or chilled (at approx. −33.4° C. at 1 atm). Alternatively, using a combination of both. For vehicles and submarines, the most convenient would be to store the ammonia ($NH_3$) under pressure, but with ships and other types of seagoing vessels it may be convenient to store the ammonia ($NH_3$) chilled. This will require a cooling system (23) to keep the ammonia ($NH_3$) chilled, in addition to insulation of the tank. The tank may be insulated so that during normal operation of a vessel or vehicle, the heat of evaporation of the ammonia ($NH_3$) consumed will be sufficient to keep the ammonia ($NH_3$) in the ammonia tank (3) liquid without additional chilling. After the fuel tank, the ammonia ($NH_3$) must be heated/vaporized in an evaporator according to the same principle as used for LPG fuel systems. If ammonia ($NH_3$) is used as a fuel for airliners, it will be natural to keep the ammonia ($NH_3$) chilled as the temperature at normal flight height is between approx. −30° C. and −50° C. For most of the flight time, the temperature is almost as low as or the same as the evaporation temperature of ammonia ($NH_3$) at the air pressure at the normal flight altitude. At a flight height of 10,000 m the air pressure is approximately 0.25 bar, corresponding to the ammonia ($NH_3$) evaporation temperature of approx. −58° C. The ammonia ($NH_3$) will have approx. ⅓ of the energy density of Jet fuel.

4) Hydrogen reactor.
Cleavage of ammonia ($NH_3$) to hydrogen ($H_2$) and nitrogen ($N_2$) occurs either by catalytic high temperature cleavage using ruthenium (Ru), or chemical cleavage using sodium (Na) following the process of the chemist Arthur Titherley.

5) Steam boiler.
Steam boilers can be used to produce steam for various purposes, for steam turbine operation for propulsion or generators, for heat or for other purposes. The steam boiler can use ammonia ($NH_3$) as a fuel Ammonia ($NH_3$) can be combusted by catalytic combustion (for example by using silver (Ag) and copper oxide ($Cu_xO_x$) on aluminium oxide ($Al_2O_3$)), electric ignition with filament or arc or pilot ignition with combustion of another fuel. Alternatively, hydrogen ($H_2$) or other fuels may be mixed with ammonia ($NH_3$) before combustion. If another fuel is used for pilot ignition, an additional fuel supply system (5-1) will be required for this. Ignition of the pilot system's fuel may be done either catalytically or electrically by filament or arc. Or a combination of these. When using gaseous fuels for pilot ignition, catalytic ignition, optionally in combination with electric ignition, is a good solution to reduce the potential for harmful emissions. The advantage of using a pilot ignition system is that in cases where ammonia ($NH_3$) is difficult to obtain, pilot ignition systems can be used as the main fuel system so that there is no downtime. For zero emission vessels or vehicles, the pilot fuel will be hydrogen ($H_2$) produced in a hydrogen reactor (4) and stored in a hydrogen tank (8). As pilot fuel in a steam boiler, bio or fossil coal can also be used. One method could be to mix coal (finely ground) with bio or other fossil fuels to facilitate ignition and better combustion of the coal. To reduce NOx emissions in the exhaust gas, the air fuel mixture for pilot ignition will be controlled so that the combustion temperature does not get high enough to generate NOx. Exhaust in the form of steam ($H_2O$) from a fuel cell (10) can be compressed using a compressor (16) and may be supplied to the steam boiler through a steam inlet ($H_2O$) from other units (5-7). The aim of this is to utilize the heat of evaporation of the steam ($H_2O$). The exhaust from the fuel cell (10) can also be pumped into the water ($H_2O$) from the steam turbine evaporator outlet (7-3) before or in the steam boiler water intake (5-5).

5-1) Supply of fuel for pilot ignition.

This is where fuel is supplied for pilot ignition. This may be hydrogen ($H_2$) from the hydrogen tank (8) or directly from the hydrogen reactor (4), alternatively other bio or fossil fuels (12). In the case of gaseous fuels, these must usually be heated/evaporated before they can be used in a steam boiler (5) to avoid icing problems. This heat can, for example, be extracted from the water which is fed into a steam boiler in a water intake (5-5). If bio or fossil fuel (12) is used, the fuel system must have sufficient capacity to heat the steam boiler (5) without ammonia ($NH_3$) if ammonia ($NH_3$) is not available. If coal is used partly or as pilot fuel, a coal mill may be required to grind the coal.

5-2) Supply of ammonia ($NH_3$).

The supply of ammonia ($NH_3$) as the main fuel for steam boiler (5). The ammonia ($NH_3$) must usually be heated/evaporated before it can be used in the steam boiler (5) to avoid icing problems. This heat can, for example, be extracted from the water which is fed into the steam boiler in the water intake (5-5).

5-3) Air intake.

The air intake provides air for the combustion of fuels in the steam boiler (5). A fan or compressor may be required to ensure sufficient air for the combustion and circulation of the gases to heat and evaporate the water ($H_2O$) in the steam boiler (5).

5-4) Exhaust outlet.

Exhaust outlet from steam boiler (5). The exhaust can be directed to fully or partly power a Stirling engine (11). With vessels, the exhaust heat can also be used for freshwater production or heating.

5-5) Water intake.

This is where the water ($H_2O$) that is to be evaporated in the steam boiler (5) is led to the steam boiler (5). Normally, this will be water ($H_2O$) from the steam turbine condenser outlet (7-3).

5-6) Steam outlet.

The steam from this outlet will normally be led to the inlet on the steam turbine's high pressure side (7-1). The steam ($H_2O$) can also be used for other purposes.

5-7) Input for steam from other units.

This is where steam ($H_2O$) from other units may be added to the steam circuit. Typically, this will be steam from a fuel cell (10) which, if required, may be compressed with a compressor (16) to provide sufficient pressure needed by the steam circuit. The advantage of such a device is that it reduces fuel consumption since it avoids having to supply this amount of steam ($H_2O$) with the heat of evaporation needed to evaporate the same amount of water ($H_2O$). If steam ($H_2O$) from other units is supplied to the steam circuit, a corresponding mass of water ($H_2O$) must be drawn off after the condenser (7-2, 7-3) as a mass of steam ($H_2O$) added to the steam circuit.

6) Nitrogen tank.

Tank for possible storage of nitrogen ($N_2$). As part of a fire extinguishing system, nitrogen ($N_2$) can be used as a gas to extinguish a fire. Either by displacing air completely, or partially. By partially displacing the air, the oxygen content ($O_2$) falls below the level required to maintain combustion. Nitrogen ($N_2$) will normally come from hydrogen production ($H_2$) from the hydrogen reactor (4), but nitrogen ($N_2$) can also be extracted from the exhaust from other units (5, 9, 11) with combustion of ammonia.

7) Steam turbine.

Turbine for either propulsion or generator operation. The turbine is normally powered by steam boilers (5). Alternatively, it can also be connected so that the turbine is powered wholly or partly by hydrogen ($H_2$) from the hydrogen tank (8) and oxygen ($O_2$) from the oxygen tank (22). The turbine will then operate so that the water ($H_2O$) from the condenser outlet (7-3) is pumped to the inlet of the steam turbine high pressure section (7-1) instead of the steam boiler water inlet (5-5). The inlet (7-1) will then function as an evaporator unit where the water ($H_2O$) is heated by combustion of hydrogen ($H_2$) and oxygen ($O_2$) directly in the inlet to the steam turbine high pressure section (7-1). Ignition of the oxyhydrogen ($2H_2+O_2$) will be catalytic, electric or a combination of these. This is done in order to use the steam turbine (7) as part of an AIP system, or as a "booster" function for briefly increasing the power of the turbine. If oxyhydrogen ($2H_2+O_2$) is burned inside the turbine's steam circuit, a corresponding mass of water ($H_2O$) must be drawn off after the condenser (7-2, 7-3) as the mass of oxyhydrogen ($2H_2+O_2$) burned in the inlet to the steam turbine high pressure side (7-1). In order to control the temperature during combustion of the oxyhydrogen ($2H_2+O_2$), water or steam ($H_2O$) can be added before, around or immediately after combustion.

7-1) Inlet to steam turbine high pressure side.

This is where steam ($H_2O$) is fed in from the steam boiler (5). This can also act as a water evaporator unit ($H_2O$) as part of an AIP system. Then with combustion of oxyhydrogen ($2H_2+O_2$) with hydrogen ($H_2$) from hydrogen tank (8) and oxygen ($O_2$) from oxygen tank (22). Alternatively, the inlet may also provide for the combustion of oxyhydrogen ($2H_2+O_2$) as a "booster" function to briefly increase the power of the turbine.

7-2) Steam turbine condenser.

This is where the steam ($H_2O$) is condensed after the steam turbine (7).

7-3) Outlet from steam turbine condenser.

This is where the water from the steam turbine condenser (7-2) is normally returned to the steam boiler water inlet (5-5). The heat in the water ($H_2O$) can also be used for other things, such as heating/vaporizing gaseous fuels.

7-4) Hydrogen ($H_2$) supply.

As a "booster" function or as part of an AIP system, oxyhydrogen ($2H_2+O_2$) can be burned in the turbine's high pressure section (7-1).

7-5) Oxygen ($O_2$) supply.

As a "booster" function or as part of an AIP system, oxyhydrogen ($2H_2+O_2$) can be burned in the turbine's high pressure section (7-1).

7-6) Ignition unit.

Catalytic or electric ignition can be used to ignite the oxyhydrogen ($2H_2+O_2$) in the steam turbine high pressure section (7-1). Alternatively, a combination of catalytic and electric ignition can be used. This ignition unit may be a wire, a spiral or a grid of platinum or other catalytic material, alternatively an electric heating wire or a spiral or a glow plug.

7-7) Water ($H_2O$) supply.

In order to control the temperature during combustion of the oxyhydrogen ($2H_2+O_2$) in the steam turbine's high pressure section (7-1), water or steam ($H_2O$) can be added before, around or immediately after combustion.

8) Hydrogen tank.

Tank for possible storage of hydrogen ($H_2$). Whether hydrogen ($H_2$) from external tank systems is used, or if hydrogen ($H_2$) from a hydrogen reactor (4) is used, a storage unit will be required to function as intermediate storage and a buffer for the supply of hydrogen ($H_2$) to units (5, 7, 9, 10, 11). These units can use hydrogen ($H_2$) as fuel either for pilot ignition of ammonia ($NH_3$) or as main fuel. The hydrogen ($H_2$) can be stored in solid form (below −259.2° C.), in liquid form (below −252.9° C.), as gas under pressure, or as a metal hydride, for example ($Mg_2Ni—H_x$).

9) Piston engine.

Engine used either for the propulsion of vehicles or vessels, the operation of generators for the production of electric power, or the operation of other systems. This may be either an engine that operates according to Otto, Diesel, Atkinson or other principles of piston engines. Due to the corrosive properties and lack of lubricating properties of ammonia ($NH_3$), it is easiest to mix air and ammonia gas ($NH_3$) in a mixer in the intake system. Because ammonia ($NH_3$) and propane ($C_3H_8$) have almost similar vapour pressure, an ammonia gas fuel system ($NH_3$) would have much in common with a similar system for LPG/propane ($C_3H_8$). The system must be calibrated for the air/fuel ratio to ammonia ($NH_3$) which stoichiometrically is approx. 6:1. However, both direct injection into the cylinder or an injection system in the intake (9-1) are possible.

Due to the low energy content (heating value) of ammonia ($NH_3$), it would for most purposes be desirable to let the engine run on a stoichiometric mixture (approx. 6:1). An exception is where there is a wish to run a diesel engine with pilot ignition of the ammonia ($NH_3$) directly in the cylinder without an additional air supply to a prechamber (9-6) for pilot ignition. In this case, the supply of ammonia ($NH_3$) will be limited by the supply of diesel or vice versa. Typically for diesel engines with a static load, the diesel supply will equal the idle amount of diesel for a pilot ignition of an ammonia ($NH_3$)/air mixture. For diesel engines with a dynamic load, as is the case with heavy and light duty vehicles, ammonia ($NH_3$) will only be supplied when the engine is subjected to a certain load, and the supply of diesel will be adjusted to achieve the desired engine performance. To facilitate ammonia ($NH_3$) ignition, hydrogen ($H_2$) can also be added to the ammonia ($NH_3$)/air mixture to improve ignition and combustion in the cylinder.

For the operation of Otto engines or other engines with spark ignition or other external ignition systems and no prechamber (9-6) of their own, it may be necessary to add hydrogen ($H_2$) to the ammonia ($NH_3$)/air mixture to ensure ignition and combustion in the cylinder.

Alternatively, the engines must have their own prechamber (9-6) for pilot ignition with a separate fuel used for pilot ignition of an ammonia ($NH_3$)/air mixture in the cylinder. A prechamber (9-6) of this kind will have its own intake valve (9-8) so that air or an air/fuel mixture can be sucked into the prechamber (9-6), in addition to suction of the ammonia ($NH_3$)/air mixture into the cylinder. This valve (9-8) can be controlled mechanically, hydraulically, pneumatically or electromechanically with a solenoid valve (9-9). Electromechanical control of the prechamber valve (9-8) with a solenoid valve (9-9) will be able to control the amount of air or air/fuel mixture to the prechamber (9-6) better than mechanical camshaft control. This can be especially useful if fossil fuels are used for pilot ignition. This is to ensure minimum emissions of $CO_2$ and $NO_x$.

In the case of engines with spark ignition (9-7), the air/fuel mixture to a prechamber (9-6) can be mixed either in the intake system of the prechamber (9-5) or with a nozzle in the prechamber (9-6).

The disadvantage of a nozzle placed in the prechamber (9-6), in addition to a spark plug (9-7), is that the prechamber (9-6) should have a small volume so it may be difficult to place both a nozzle and a spark plug (9-7) there and also allow room for the intake valve (9-8) to be opened to let in an air/fuel mixture. In the intake to the prechamber (9-5) the air/fuel mixture can either be mixed in a carburettor if it is liquid fuel, or in a gas mixer if it is gaseous fuel, or be mixed with an injection nozzle. This air/fuel mixture will ignite with a spark plug (9-7) and will further ignite and ensure combustion of the ammonia/air mixture in the cylinder. With zero emission vessels or vehicles, the pilot fuel will be hydrogen ($H_2$) produced in a hydrogen reactor (4) and placed for intermediate storage in a hydrogen tank (8), or alternatively be filled directly into a hydrogen tank (8) from its own hydrogen ($H_2$) fuelling station.

In addition, if the piston engine is operated with bio or fossil pilot ignition fuels, there should also be a fuel system for these fuels in the engine's normal intake (9-1). This is to ensure reliable operation of the engine even if there is a lack of ammonia ($NH_3$). This may be in the form of a carburettor if it is liquid fuel, a gas mixer for gaseous fuels, or with injection nozzles.

In the case of diesel engines, the prechamber valve (9-8 and 9-9) will control the amount of air sucked into the prechamber (9-6). The ammonia ($NH_3$)/air mixture is sucked into the cylinder, and the process otherwise corresponds to the process of a traditional diesel engine with prechamber. If there is direct injection of ammonia ($NH_3$) into the cylinder there will be no need for a separate valve (9-8) to the prechamber (9-6), but only a separate injector nozzle for diesel or biodiesel for pilot ignition (9-7). With engines that operate by the diesel principle, a glow plug will be fitted in the prechamber (9-6), as is done on conventional diesel engines with prechamber/swirl chamber. The diesel injection system should be large enough for the engines to run on diesel or biodiesel only if ammonia ($NH_3$) is not available. In order to reduce NOx emissions in the exhaust of a diesel engine using ammonia ($NH_3$) as the main fuel, the air/fuel mixture for pilot ignition can be controlled so that the combustion temperature does not get high enough to generate NOx.

The exhaust (9-3) can be directed to fully or partly power a Stirling engine (11). For vessels, the exhaust heat can also be used for freshwater production.

Optionally, the exhaust (9-3) can be connected to a heat exchanger/exhaust boiler to heat or evaporate water ($H_2O$). This is done to obtain hot water for various purposes or, alternatively, to vaporize water ($H_2O$) for steam production ($H_2O$) as preheating to a steam boiler (5) or directly to a steam turbine (7). The same principle as described for piston engines can also be used for Wankel engines/rotary engines.

9-1) Piston engine intake.

Normally an air/ammonia ($NH_3$) mixture will be sucked or pressed with turbocharger or compressor into the cylinder Ammonia ($NH_3$) can be mixed with air with a gas mixer similar to those used for an LPG system. The gas mixer must be calibrated for ammonia's ($NH_3$) stoichiometric air/fuel ratio (about 6:1). Alternatively, ammonia ($NH_3$) can be supplied using one or more injector nozzles. When using a gas mixer, ammonia ($NH_3$) must be evaporated in an evaporator before the gas mixer, as is done in LPG system. If injector nozzles are used, a heat supply will be required to prevent possible icing of the nozzles due to ammonia ($NH_3$) evaporation. With turbocharged engines, the intake air heat will often be sufficient. Alternatively, the intake manifold can be heated with the engine's cooling water to keep the nozzles free of frost and icing. The nozzles can also be heated using other heat devices. In the case of engines with spark ignition this intake can also have several fuel systems. The most common will be injector nozzles also for bio and fossil fuels, alternatively CNG, LNG or LPG systems if these fuels are used for pilot ignition. If the engine is to run as a zero emission engine, hydrogen ($H_2$) can be mixed in the ammonia ($NH_3$) before the gas mixer or, alternatively, added to the air/ammonia ($NH_3$) mixture in the intake manifold. If hydrogen ($H_2$) is added to the air/ammonia ($NH_3$) mixture in the engine's intake manifold, there is no need for a pilot ignition system with prechamber (9-6) to ignite the air/fuel mixture in the cylinder.

9-2) Intake valve control.

Four-stroke piston engines use traditional valve control, alternatively with variable opening times and lift. The valve can also be electromechanically controlled by a solenoid valve, controlled hydraulically or pneumatically.

9-3) Piston engine exhaust outlet.

Engine exhaust outlet. The exhaust can optionally be directed to fully or partially operate a Stirling engine (11). The exhaust heat can also be used for other purposes such as water production on ships and other vessels. With generator sets, the exhaust heat can be used for steam production for operation of a steam turbine (7).

9-4) Exhaust valve control.

Four-stroke piston engines use traditional valve control. Two-stroke piston engines with an exhaust valve also use this traditional valve control. Alternatively, it can be a valve with variable opening times and lift. The valve can also be electromechanically controlled by a solenoid valve, controlled hydraulically or pneumatically.

9-5) Prechamber intake.

With diesel engines, only air will be sucked or pressed in. With pure zero emission engines, the prechamber (9-6), if any, will have an air/hydrogen ($H_2$) mixture. With pure zero emission engines, it is also possible to mix hydrogen ($H_2$) directly with ammonia ($NH_3$) without the need for a prechamber (9-6) and this intake. In the case of engines with spark ignition (9-7) and bio or fossil fuels as pilot ignition fuels, this intake will have a carburettor, gas mixer or injector nozzles to supply the pilot ignition fuel to the air.

9-6) Prechamber.

This is a prechamber for ignition of the pilot fuel. In the case of engines with spark ignition (9-7), the design of the prechamber and the sparkplug's (9-7) position must be such that after the engine has compressed the air/fuel mixtures, the bulk of the air/pilot fuel mixture will be concentrated around the spark plug (9-7) so that this mixture is easily ignited. The combusted gases will be led in a channel into the cylinder and ignite the air/ammonia ($NH_3$) mixture.

9-7) Pilot fuel ignition device.

In the case of engines with spark ignition, this will be a spark plug. With diesel engines this will be both a diesel injector nozzle and a glow plug. With diesel engines, the diesel system will be large enough for the engine to be operated as a traditional diesel engine if no ammonia ($NH_3$) is available as fuel.

9-8) Prechamber intake valve.

This will normally be a standard intake valve. Due to the high heat load and low cooling effect that is normal in this part of the piston engine (9), it is important to design the valve control (9-9) to ensure sufficient cooling of this valve and valve seat. A sodium (Na) filled valve stem may be required. Alternatively, another construction that provides sufficient cooling of this valve.

9-9) Prechamber intake valve control.

This may be traditional camshaft valve control, but in order to optimize operation and/or combustion it may also be electromechanically operated valve control using a solenoid valve. Alternatively, there may be hydraulic or pneumatic control of the prechamber intake valve (9-8).

10) Fuel cell.

For the production of electric power for different purposes, hydrogen ($H_2$) produced in a hydrogen reactor (4) can be used by a fuel cell to produce electricity. Different types of fuel cells can be used depending on the requirements and area of application. With vessels where the pilot ignition fuel is CNG/LNG/LPG or methanol, a Solid Oxide Fuel Cell (SOFC) may be an alternative as this type transports oxygen ($O_2$) to the fuel. In the case of vessels, a high temperature or long start-up time will not be of great importance in the operation of fuel cells. When using other fuels than pure hydrogen ($H_2$), an exhaust outlet will be required. Either a separate exhaust outlet, or connected to the exhaust outlet for other devices (5, 9, 11). A pump for the exhaust may then be required. If the fuel cell is part of an AIP system, the reaction of hydrogen ($H_2$) and oxygen ($O_2$) will produce pure water vapour ($H_2O$) as exhaust. The exhaust is fed to a heat exchanger for condensation, or compressed with a compressor (16) and led to a steam boiler (5).

11) Stirling engine/hot gas engine.

In order to utilize waste heat from other units (5, 7, 9, 10) a Stirling engine/hot gas engine can be used. The most practical way is to use such an engine to power a generator to produce electricity. If necessary, this can also be operated with combustion of ammonia ($NH_3$) from an ammonia tank (3), hydrogen ($H_2$) from a hydrogen tank (8) or with other fuels stored in tanks (12). When using ammonia ($NH_3$), either hydrogen ($H_2$) or other fuels must be used for pilot ignition. Alternatively, hydrogen ($H_2$) or other fuels may be mixed with ammonia ($NH_3$) before combustion. With submarines, combustion with pure oxygen ($O_2$) as part of an AIP system can be used if the submarine is in submerged position.

11-1) Drive shaft.

This is the Stirling engine's drive shaft/crankshaft.

11-2) Working piston.

This is the part of the Stirling engine where the work medium performs work.

11-3) Displacer.

This the part of the Stirling engine that displaces the work medium alternately from the heated to the cooled side of the chamber.

11-4) Insulation between the heated and cooled side.

The Stirling engine will require that part of the engine block to be designed as an insulating element between the engine's heated and cooled side.

11-5) Cooled side.

This is the part of the Stirling engine where the work medium is cooled down and contracts.

11-6) Heated side.

This is the part of the Stirling engine where the work medium is heated and expands.

11-7) Heated side intake.

This may be an intake for exhaust from a steam boiler (5) or piston engine (9), alternatively an intake for air or air/fuel mixtures combusted on the Stirling engine's heated side (11-6). If the Stirling engine (11) is part of an AIP system, water or steam ($H_2O$) is introduced before combustion of oxyhydrogen ($2H_2+O_2$) in the heated side of the Stirling engine (11-6). If there is combustion of fuel with air on the heated side of the Stirling engine (11-6), a pump/compressor may be required before or as part of this intake to supply the required amount of air for combustion.

11-8) Supply of hydrogen ($H_2$).

If the Stirling engine (11) is part of an AIP system, hydrogen ($H_2$) is added here. Alternatively, hydrogen ($H_2$) is added here if used as pilot ignition fuel where the Stirling engine (11) is operated with ammonia ($NH_3$) as the main fuel.

11-9) Supply of oxygen ($O_2$).

If the Stirling engine (11) is part of an AIP system, oxygen ($O_2$) is added here.

11-10) Ignition unit.

This is an electric heating element, a sparkplug or a catalytic element for ignition of fuels from the heated side intake (11-7) and the supply of hydrogen ($H_2$) (11-8).

11-11) Supply of ammonia ($NH_3$).

If the Stirling engine (11) is fully or partially powered by combustion of ammonia ($NH_3$), this will be supplied immediately after ignition of the pilot ignition fuel (11-10) on the heated side of the Stirling engine (11-6).

11-12) Exhaust outlet.

Exhaust gas outlet. Whether the Stirling engine (11) is powered by exhaust from other energy sources, and/or by the combustion of fuel, the exhaust gas will be exited here. If the Stirling engine (11) is part of an AIP system, the combustion on the heated side of the Stirling engine (11-6) will occur with combustion of hydrogen ($H_2$) and oxygen ($O_2$) in a steam atmosphere ($H_2O$) or with the addition of water ($H_2O$). The exhaust will then be pure water vapour ($H_2O$) which is led to a heat exchanger for condensation.

12) Fuel tank for bio or fossil fuels.

Tank for solid, liquid or gaseous bio or fossil fuels for the units (5, 9, 10, 11) that can use this as a fuel. Either for pilot ignition of ammonia ($NH_3$) or as main fuel.

13) Exhaust outlet.

This is the exhaust outlet for steam boiler (5), piston engine (9), Stirling engine/hot gas engine (11) and possible fuel cell (10).

14) Pump/Compressor.

Possible compressor to compress nitrogen ($N_2$) at storage pressure in nitrogen tank (6).

15) Pump/Compressor.

Possible compressor to compress hydrogen ($H_2$) at storage pressure in hydrogen tank (8) or supply other units (5, 7, 9, 11) with hydrogen ($H_2$) from hydrogen reactor (4).

16) Pump/Compressor.

Possible compressor to compress steam ($H_2O$) at required pressure for use in steam boiler (5).

17) Pump/Compressor.

Possible compressor to pump exhaust from steam boiler (5).

18) Pump/Compressor.

Possible compressor to pump exhaust from piston engine (9).

19) Pump/Compressor.

Possible compressor to pump exhaust from Stirling engine/hot gas engine (11).

20) Pump/Compressor.

Possible compressor to pump nitrogen ($N_2$) and any other gases from hydrogen reactor (4).

21) Fuel pump.

Fuel pump to supply bio or fossil fuel to steam boiler (5), piston engine (9), Stirling engine/hot gas engine (11) and alternatively fuel cell (10).

22) Oxygen tank.

Tank for possible storage of oxygen ($O_2$). This will be part of an AIP system, or part of a "booster" system for a steam turbine (7).

23) Cooling system for ammonia ($NH_3$).

Cooling system for ammonia tank (3) when chilled ammonia ($NH_3$) is stored. The system must be able to keep the ammonia ($NH_3$) in a liquid state in the ammonia tank (3).

Configuration of the Invention for Five Typical Areas of Application Based on an Embodiment of the Invention as Exemplified in FIG. 1:

A) Propulsion and Generator System for Submarines.

The system will be as illustrated schematically in FIG. 1. As a fuel, ammonia ($NH_3$) will be the main fuel with diesel or biodiesel (12) as the pilot and reserve fuel Ammonia ($NH_3$) will be stored under pressure in an ammonia tank (3). The hydrogen reactor (4) with hydrogen tank (8) will be part of the submarine's AIP system along with the oxygen tank (22). This AIP system may consist of a Stirling engine/hot gas engine (11) and/or fuel cell (10). The Stirling engine/hot gas engine (11) will be able to drive the generator for the production of electric power and, in the event, the operation of other necessary systems when the submarine is submerged. The fuel cell (10) could be used to produce electric power when the submarine is submerged. The steam turbine (7) can also be used as part of the submarine's AIP system. The steam turbine could then be fully or partly driven by the combustion of hydrogen ($H_2$) and oxygen ($O_2$) directly on the turbine high pressure side (7-1). The steam turbine would then either have the "booster" function of quickly heating up more steam produced in the steam boiler (5) or, alternatively, operate outside the steam boiler (5) and evaporate water directly from the steam turbine condenser (7-2, 7-3).

Otherwise, the steam turbine (7) powered by the steam boiler (5) will be the main engine for propulsion and operation of the generator for the production of electric power, and possibly the operation of other systems while the submarine is in surface position or at snorkel depth.

The piston engine (9) will primarily be a reserve engine for propulsion and operation of the generator for the production of electric power and, if necessary, the operation of other systems while the submarine is in surface position or at snorkel depth.

One or more nitrogen tanks (6) will be part of the submarine's fire extinguishing system, and the nitrogen can also be used for submarine ballast tank blows.

Ammonia ($NH_3$) is used as the main fuel and diesel for pilot ignition. The submarine can then operate with diesel as the main fuel if the ammonia ($NH_3$) supply should fail.

B) Propulsion and Generator System for Ships.

As a fuel, ammonia ($NH_3$) will be the main fuel with bio or fossil fuel (12) as the pilot and reserve fuel. The ammonia ($NH_3$) will be stored in chilled liquid form in an ammonia tank (3). The cooling system (23) is used to keep the ammonia ($NH_3$) chilled and in liquid form.

With large ships, the propulsion machinery consists of a steam turbine (7) powered by steam from a steam boiler (5). One or more piston engines (9) will have an auxiliary engine function, primarily for the operation of generators. The Stirling engine/hot gas engine (11) can also be used to utilize the waste heat in the exhaust from the steam boiler (5) and/or piston engines (9). The Stirling engine (11) will be used for the operation of a generator or other equipment.

With smaller ships, one or more piston engines (9) will be used for both propulsion and the operation of generators. It would be natural for ships to use ammonia ($NH_3$) as the main fuel and diesel for pilot ignition. The ship can then be operated with diesel as the main fuel if the ammonia supply ($NH_3$) should fail. Alternatively, pilot ignition in the steam boiler (5) can be effected using coal or a mixture of coal and bio or other fossil fuels.

C) Propulsion System for Vehicles with Engine Using Spark Ignition.

As a fuel, ammonia ($NH_3$) will be the main fuel with bio or fossil fuel (12) as the pilot and reserve fuel. The ammonia ($NH_3$) will be stored under pressure in an ammonia tank (3).

The propulsion system is the piston engine (9). In the cylinder intake (9-1) there will be a mixer for mixing ammonia ($NH_3$) and air, in addition to injector nozzles for bio or fossil fuels. This is so that the vehicle can also be used in the absence of ammonia ($NH_3$). The prechamber intake system (9-5) will have injector nozzles for bio or fossil fuels. The air/fuel mixture to the prechamber (9-6) for pilot ignition will be regulated by a valve (9-8) that is electromagnetically controlled (9-9). This is in order to optimize combustion and minimize emissions of harmful exhaust gases. The air/fuel mixture in the prechamber (9-6) is ignited by a spark plug (9-7).

Due to the low energy content (heating value) and poor flammability of ammonia ($NH_3$), it would be advantageous to use a stepless transmission such as CVT (continuously variable transmission) to optimize the engine operating parameters/load in order to achieve the best possible combustion of ammonia ($NH_3$).

D) Propulsion System for Vehicles with Compression Ignition Engines (Diesel).

As a fuel, ammonia ($NH_3$) will be the main fuel with diesel or biodiesel (12) as the pilot and reserve fuel. The ammonia ($NH_3$) will be stored under pressure in an ammonia tank (3).

The propulsion system is the piston engine (9). In the cylinder intake (9-1) there will be a mixer for mixing ammonia ($NH_3$) and air. The air to the prechamber is regulated by a valve (9-8) that is electromagnetically controlled (9-9). This is in order to optimize combustion and minimize emissions of harmful exhaust gases. Otherwise, the engine (9) is a traditional diesel engine with a prechamber, but the diesel injection system can be regulated to inject the amount of diesel or biodiesel required to achieve the best possible combustion of ammonia ($NH_3$) in the cylinder. It could also function as the main fuel system if ammonia ($NH_3$) is not available. A glow plug (9-7) can be used to ignite the diesel in the prechamber (9-6), especially with a cold start.

Due to the low energy content (heating value) and poor flammability of ammonia ($NH_3$), it would be advantageous to use a stepless transmission such as CVT (continuously variable transmission) to optimize the engine operating parameters/load in order to achieve the best possible combustion of ammonia ($NH_3$).

E) Propulsion System for Zero Emission Vehicles (ZEV).

Ammonia ($NH_3$) is used as the main fuel, stored under pressure in an ammonia tank (3). To improve ignition and combustion, a hydrogen tank (8) will be used to mix more hydrogen ($H_2$) into the air/fuel mixture. The hydrogen ($H_2$) supplied to the hydrogen tank (8) can come either from an external filling source, or from a hydrogen reactor (4). The piston engine will be a traditional Otto engine, with a mixer for air and fuel where the hydrogen ($H_2$) is already dosed into the ammonia ($NH_3$) between the ammonia tank (3) and the gas mixer in the piston engine intake system (9-1).

Alternatively, the piston engine (9) may have pilot ignition of an air/ammonia ($NH_3$) mixture in the cylinder by mixing hydrogen ($H_2$) with air in the prechamber intake (9-5) and ignition of an air/hydrogen ($H_2$) mixture with a spark plug (9-7) in the prechamber (9-6). The air/hydrogen ($H_2$) mixture will then be regulated by the prechamber intake valve (9-8) which is controlled electromagnetically (9-9).

The invention claimed is:

1. A zero emission system for one or more different types of piston engines configured to be operable with ammonia ($NH_3$) as a main fuel, the system comprising:
   a pilot ignition system configured to ignite a pilot fuel for pilot ignition of an air and ammonia mixture in a cylinder of a piston engine, the pilot fuel including at least hydrogen ($H_2$), and wherein the pilot ignition system comprises:
      a first intake that is separate from a second intake of the engine directly coupled to the cylinder for supplying the air and ammonia mixture to the cylinder, wherein the first intake is configured to receive the pilot fuel and air separate from the air and ammonia mixture supplied to the cylinder via the second intake;

an intake valve coupled to the first intake to receive the pilot fuel and control flow of the pilot fuel;

a prechamber coupled to the intake valve and configured to receive the pilot fuel;

an intake valve controller configured to operate the intake valve for control of the flow of the pilot fuel into the prechamber;

an ignition device coupled to the prechamber and configured to ignite the pilot fuel in the prechamber; and a channel disposed between the prechamber and the cylinder configured to channel combustion gases resulting from ignited pilot fuel in the prechamber to the cylinder for pilot ignition of the air and ammonia mixture in the cylinder.

2. The system of claim 1 further comprising:

utilizing biofuels or fossil fuels as the pilot fuel to be used for pilot ignition when a complete zero emission system is not required, wherein the system is operable as a non-zero emission engine powered by one of biofuels, fossil fuels, or ammonia as the main fuel.

3. The system of claim 2 further comprising:

utilizing the pilot ignition fuel as the main fuel when a complete zero emission system is not required.

4. The system of claim 1 wherein the valve controller further comprises, when using ammonia ($NH_3$) as the main fuel for the engine at least one of a camshaft, an electromagnetic actuator, a hydraulic actuator, or a pneumatic actuator.

5. The system of claim 1 further comprising:

the system configured to utilize diesel or biodiesel fuel as at least the pilot ignition fuel, wherein the pilot ignition system includes an injector nozzle and a glow plug coupled with the prechamber for operation of the system as a compression ignition engine that is operable as a non-zero emission engine powered by one of diesel, biodiesel, or ammonia ($NH_3$) as the main fuel.

6. The system of claim 1 further comprising:

a Stirling engine coupled to an exhaust of the engine, wherein the Stirling engine is configured to be capable of being operated with providing excess heat from the exhaust to the engine.

7. The system of claim 1, wherein the system is calibrated for the mixture of air and ammonia, wherein an air to fuel ratio of the mixture is a stoichiometric mixture approximately equal to six parts air to one part ammonia.

8. The system of claim 1 further comprising utilizing a main fuel that is the same as the pilot ignition fuel when the system is operated with a main fuel other than ammonia ($NH_3$).

* * * * *